United States Patent
Hayakawa et al.

(10) Patent No.: US 8,324,377 B2
(45) Date of Patent: Dec. 4, 2012

(54) METHOD OF SEPARATING WATER-SOLUBLE CELLULOSE ETHER

(75) Inventors: Kazuhisa Hayakawa, Joetsu (JP); Shinichi Kurotani, Joetsu (JP); Mitsuo Narita, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/262,910

(22) Filed: Nov. 1, 2005

(65) Prior Publication Data

US 2006/0122384 A1    Jun. 8, 2006

(30) Foreign Application Priority Data

Nov. 2, 2004   (JP) ................. 2004-318769

(51) Int. Cl.
- C08B 11/20 (2006.01)
- B01D 37/00 (2006.01)
- B01D 33/073 (2006.01)
- B01D 33/45 (2006.01)
- B01D 33/50 (2006.01)

(52) U.S. Cl. ............ 536/127; 536/84; 536/85; 210/773; 210/784; 210/791; 210/805; 210/402; 210/407; 210/409

(58) Field of Classification Search .......... 210/768, 210/797

See application file for complete search history.

(56) References Cited

U.S. PATENT DOCUMENTS

| | | | | |
|---|---|---|---|---|
| 690,030 A | * | 12/1901 | Parker | 210/391 |
| 1,949,998 A | * | 3/1934 | French | 210/383 |
| 2,469,764 A | * | 5/1949 | Erickson | 536/96 |
| 2,572,039 A | * | 10/1951 | Klug et al. | 536/85 |
| 2,772,002 A | * | 11/1956 | Mauro | 210/445 |
| 2,814,620 A | * | 11/1957 | Stewart et al. | 536/85 |
| 2,839,419 A | * | 6/1958 | Windover et al. | 106/193.1 |
| 2,949,452 A | * | 8/1960 | Savage | 536/91 |
| 3,296,247 A | * | 1/1967 | Klug | 536/91 |
| 3,347,847 A | * | 10/1967 | Galinke et al. | 536/85 |
| 3,579,422 A | * | 5/1971 | Minick et al. | 162/314 |
| 3,719,663 A | * | 3/1973 | Klug | 536/88 |
| 3,747,770 A | * | 7/1973 | Zentis | 210/402 |
| 3,773,614 A | * | 11/1973 | Pennington | 162/357 |
| 3,873,518 A | * | 3/1975 | Strange et al. | 536/91 |
| 4,155,845 A | * | 5/1979 | Ancelle et al. | 210/650 |
| 4,229,572 A | * | 10/1980 | Zweigle | 536/89 |
| 4,239,954 A | * | 12/1980 | Howard et al. | 219/121.18 |
| 4,296,235 A | * | 10/1981 | Ziche | 536/85 |
| 4,364,836 A | * | 12/1982 | Ziche | 510/473 |
| 4,376,046 A | * | 3/1983 | Deutsch | 210/176 |
| 4,398,024 A | * | 8/1983 | Bernert et al. | 536/85 |
| 4,404,370 A | * | 9/1983 | Bernert et al. | 536/85 |
| 4,458,068 A | * | 7/1984 | Warner et al. | 536/91 |
| 4,477,657 A | * | 10/1984 | Strange et al. | 536/91 |
| 4,581,446 A | * | 4/1986 | Schulz | 536/85 |
| 4,672,113 A | * | 6/1987 | Wallisch et al. | 536/85 |
| 4,820,813 A | * | 4/1989 | Schulz | 536/84 |
| 4,954,268 A | * | 9/1990 | Just et al. | 210/772 |
| 4,963,271 A | * | 10/1990 | Raehse et al. | 210/772 |
| 4,968,789 A | * | 11/1990 | Wuest et al. | 536/56 |
| 4,979,681 A | * | 12/1990 | Donges et al. | 241/17 |
| 4,985,152 A | * | 1/1991 | Hilbig et al. | 210/771 |
| 4,988,807 A | * | 1/1991 | Christensen et al. | 536/127 |
| 5,218,107 A | * | 6/1993 | Schulz | 536/84 |
| 5,328,666 A | * | 7/1994 | Amano et al. | 422/138 |
| 5,330,642 A | * | 7/1994 | Klein | 210/194 |
| 5,354,479 A | * | 10/1994 | Wretborn et al. | 210/728 |
| 5,360,902 A | * | 11/1994 | Brauer et al. | 536/84 |
| 5,407,563 A | * | 4/1995 | Blake | 210/155 |
| 5,482,634 A | * | 1/1996 | Goerlach-Doht et al. | 210/651 |
| 5,500,124 A | * | 3/1996 | Wallisch et al. | 210/651 |
| 5,637,216 A | * | 6/1997 | Dillier | 210/335 |
| 5,643,450 A | | 7/1997 | Bacher et al. | |
| 5,719,274 A | * | 2/1998 | Doenges et al. | 536/85 |
| 5,792,349 A | * | 8/1998 | Buettner et al. | 210/232 |
| 5,928,709 A | * | 7/1999 | Doenges et al. | 427/2.14 |
| 6,022,474 A | * | 2/2000 | MacKelvie | 210/170.01 |
| 6,105,788 A | * | 8/2000 | Williamson et al. | 210/489 |
| 6,174,358 B1 | * | 1/2001 | Oberkofler et al. | 106/200.1 |
| 6,461,507 B1 | | 10/2002 | Ishigaki et al. | |
| 6,652,760 B2 | * | 11/2003 | Anderson | 210/767 |
| 6,723,240 B1 | * | 4/2004 | Minemura | 210/497.01 |

(Continued)

FOREIGN PATENT DOCUMENTS

EP   0761692 A2   3/1997

(Continued)

OTHER PUBLICATIONS

T. Terabayashi et al., "Study on Electron Beam Machining—Forced Removal of Molten Part in Workpiece by Backing Material," Journal of Precision Engineering Society, vol. 53, No. 5, pp. 789-794, 1987.
K. Horio, "High-Speed Drilling of Difficult-to Electron-Beam-Machine Materials," Machinery Technology, vol. 37, No. 8, pp. 47-52.
K. Horio, Partial English translation of "High-Speed Drilling of Difficult-to Electron-Beam-Machine Materials," Machinery Technology, vol. 37, No. 8, pp. 47-52. Jun. 1989.
Amendment filed on Jun. 1, 2007 in corresponding European Patent Application No. 05256752.6.
Notice of Opposition by Akzo Nobel Chemicals International B.V. dated Jul. 14, 2009 issued in corresponding European Application No. 05256752.6.

(Continued)

*Primary Examiner* — Robert James Popovics
(74) *Attorney, Agent, or Firm* — Birch, Stewart, Kolasch & Birch, LLP

(57) ABSTRACT

A water-soluble cellulose ether is separated from its suspension by passing a suspension of water-soluble cellulose ether particles in water through a filter of perforated metallic or ceramic filter medium under pressure, removing the filter cake of water-soluble cellulose ether from the filter medium, and cleaning the filter medium with steam, compressed air or water under pressure. The invention enables to separate a water-soluble cellulose ether, especially having a high dissolution temperature, avoids the filter from being clogged, and extends the operative time of the filter.

1 Claim, No Drawings

U.S. PATENT DOCUMENTS

| | | | |
|---|---|---|---|
| 6,884,883 B1 * | 4/2005 | Shima et al. | 536/56 |
| 6,960,660 B2 * | 11/2005 | Niinobe et al. | 536/85 |
| 8,197,699 B2 * | 6/2012 | Kowollik et al. | 210/784 |
| 2004/0206686 A1 * | 10/2004 | Reinach et al. | 210/360.1 |
| 2004/0206687 A1 * | 10/2004 | Reinach et al. | 210/360.1 |
| 2004/0206688 A1 * | 10/2004 | Reinach et al. | 210/369 |
| 2006/0122384 A1 * | 6/2006 | Hayakawa et al. | 536/85 |
| 2007/0144692 A1 * | 6/2007 | Narita et al. | 162/90 |
| 2007/0149771 A1 * | 6/2007 | Narita et al. | 536/84 |
| 2007/0149772 A1 * | 6/2007 | Narita et al. | 536/84 |
| 2007/0149773 A1 * | 6/2007 | Narita et al. | 536/84 |
| 2007/0210014 A1 * | 9/2007 | Kowollik et al. | 210/784 |
| 2011/0046365 A1 * | 2/2011 | Mikkonen et al. | 536/68 |

FOREIGN PATENT DOCUMENTS

| | | | |
|---|---|---|---|
| EP | 1375523 A1 | | 1/2004 |
| EP | 1375523 A1 | * | 1/2004 |
| EP | 1652860 A1 | * | 5/2006 |
| JP | 1-217001 A | | 8/1989 |
| JP | 2-269101 A | | 11/1990 |
| JP | 5-239102 A | | 9/1993 |
| JP | 5-255409 A | | 10/1993 |
| JP | 7-119241 B2 | | 12/1995 |
| JP | 8-507008 A | | 7/1996 |
| JP | 8-231602 A | | 9/1996 |
| JP | 2895084 B2 | | 3/1999 |
| WO | WO 00/16970 A1 | | 3/2000 |

OTHER PUBLICATIONS

Notice of Opposition by the Dow Chemical Company dated Jul. 14, 2009 issued in corresponding European Patent Application No. 05256752.6.

Opposition filed on Jul. 8, 2009 in corresponding Europan Patent No. EP 1652860 B1.

Response to Opposition filed by Dow and Akzo Nobel on Mar. 1, 2010 in corresponding European Patent Application No. 05256752.6 (European Patent No. EP 1652860).

Japanese Office Action for Application No. 2005-314435 dated Jun. 22, 2011.

Office Action for corresponding Japanese Patent Application No. 2005-314435, mailed Mar. 14, 2012.

Sakuma, "High-speed electron beam drilling of microscopic pores," Special Topic: Processing technique for making "microscopic pores" with a high accuracy and high efficiency, vol. 43, pp. 76-78, Aug. 1999.

* cited by examiner

METHOD OF SEPARATING WATER-SOLUBLE CELLULOSE ETHER

CROSS-REFERENCE TO RELATED APPLICATION

This non-provisional application claims priority under 35 U.S.C. §119(a) on Patent Application No. 2004-318769 filed in Japan on Nov. 2, 2004, the entire contents of which are hereby incorporated by reference.

TECHNICAL FIELD

This invention relates to a method of separating a water-soluble cellulose ether from its suspension in water as a filter cake by pressure filtration, the water-soluble cellulose ether typically having excellent plastic properties and high dissolution temperature. A water-soluble cellulose ether behaves as follows after it is dispersed in hot water. As the dispersion cools, the cellulose ether is slowly dissolved in water so that the water-soluble cellulose ether solution increases its viscosity in proportion. In this course, however, at a certain temperature, the rate of viscosity increase becomes slowed down. The "dissolution temperature" is determined by dispersing a water-soluble cellulose ether in hot water at or above 95° C. in a concentration of 1% by weight, cooling the dispersion (which builds up a viscosity with a lowering of temperature), monitoring the viscosity of the dispersion, and detecting the temperature at which the viscosity makes a substantial change relative to a lowering of temperature (that is, the rate of viscosity increase becomes slowed down).

BACKGROUND ART

Methyl cellulose is prepared by etherifying alkali cellulose with methyl chloride at temperatures of about 50 to 90° C. as described in Examples of JP-B 7-119241. After the etherifying reaction, the reaction mixture is introduced into an agitator vessel containing water at about 95° C. where the salt formed during the reaction is dissolved in water. The suspension exiting the agitator vessel is then subjected to a separation operation in order to obtain the desired pure cellulose ether.

In the separation operation, the use of rotary pressure filters is considered. However, the customary textile filter coverings for rotary pressure filters suffer from the problem that products having a high dissolution temperature penetrate and dwell in the filter so that the filter is clogged and becomes inoperative within a short filtering time. The clogging may be cleared by washing with high-pressure steam or hot water, the customary mesh size filter can be stretched in mesh size or even ruptured. The problem is overcome in U.S. Pat. No. 4,954,268 or Japanese Patent No. 2,895,084 by using a filter of multi-layer sintered metal structure having an increased strength. The multi-layer structure leaves a problem that once the filter is clogged with the product, it is difficult to remove the clogging product by washing.

DISCLOSURE OF THE INVENTION

An object of the present invention is to provide a method of separating a water-soluble cellulose ether from its suspension in water using a filter system while avoiding the filter from being clogged and permitting the filter system to operate effectively over an extended period of time.

The inventor has found that a water-soluble cellulose ether can be separated from a suspension of water-soluble cellulose ether in water without substantial problems by filtering through a filter system using a perforated metal or ceramic filter medium, and cleaning the filter medium with steam, compressed air or water under pressure after the filtration. The filter system is kept operable for a long period. The cleaning of the filter medium after filtration not only prevents the filter medium from being clogged, but also washes out the water-soluble cellulose ether remaining within the filter medium, eliminating any loss of water-soluble cellulose ether.

The present invention provides a method of separating a water-soluble cellulose ether from its suspension, comprising the steps of passing a suspension of water-soluble cellulose ether particles in water through a pressure filter of perforated metallic or ceramic filter medium for leaving a cake of water-soluble cellulose ether on the filter, removing the filter cake from the filter medium, and cleaning the filter medium with steam, compressed air or water under pressure.

Preferably the filter medium is perforated to a pore size substantially corresponding to an average diameter of suspended particles. The filter medium is typically a special steel containing at least 8% by weight of nickel and at least 18% by weight of chromium. The preferred suspension comprises the water-soluble cellulose ether and water in a weight ratio of 10/100 to 50/100. The water-soluble cellulose ether is typically an alkyl cellulose, hydroxyalkyl alkyl cellulose or hydroxyalkyl cellulose.

In a preferred embodiment, the method further comprises the steps of washing the filter cake with one or both of hot water and steam, and back blowing steam, compressed air or water under pressure from the filter medium side to loosen the filter cake from the filter medium, prior to the removal of the filter cake.

In a further preferred embodiment, after the removal of the filter cake from the filter medium, water under pressure is sprayed to the filter medium from a jet nozzle for rinsing the filter medium and the resulting rinse water is recycled for washing the filter cake.

The present invention enables to separate a water-soluble cellulose ether, especially having a high dissolution temperature, from a suspension of water-soluble cellulose ether in water, avoids the filter system from being clogged, and extends the operative time of the filter system.

DESCRIPTION OF THE PREFERRED EMBODIMENT

The method of the invention is for separating a water-soluble cellulose ether from a suspension of water-soluble cellulose ether particles in water using a filter. The filter is made of a perforated metallic or ceramic filter medium.

The filter medium should preferably be perforated to a pore size substantially corresponding to an average diameter of suspended particles. The filter medium with such a pore size can capture even fine particles having a smaller diameter than the pore size.

For corrosion prevention, the metal material used herein may be selected from special steels having corrosion resistance, specifically special steels containing at least 5% by weight of nonferrous metals. For example, special steels which are resistant to salts in water-soluble cellulose ether suspended liquids and filter cake wash liquids are preferred, with special steels containing at least 8% by weight of nickel and at least 18% by weight of chromium being more preferred as the perforated filter medium. The use of such metallic filter medium prevents the occurrence of stress crack corrosion due to the high salt content of the hot suspension.

These perforated materials can be manufactured by known methods as described in T. Terabayashi and K. Kajio, "Study on Electron Beam Machining," Journal of Precision Engineering Society, vol. 53, No. 5, 1987, pp. 789-794; and K. Kajio, "High-Speed Drilling of Difficult-to-Electron-Beam-Machine Materials," Machinery Technology, vol. 37, No. 8, pp. 47-52.

The ceramic material may be selected from oxide and non-oxide based ceramic materials having salt resistance, for example, alumina, magnesia, zirconia, and ferrite. Silicon carbide, silicon nitride and similar ceramic materials are also useful. Zirconia is most preferred because of toughness.

The filter medium typically has a thickness of 0.2 to 20 mm, preferably 2 to 10 mm, in the filtrate direction.

The water-soluble cellulose ether used in the present invention preferably has a dissolution temperature of at least 20° C. and may include an alkyl cellulose, hydroxyalkyl cellulose, and hydroxyalkyl alkyl cellulose.

Examples of alkyl cellulose include methyl cellulose having 1.0 to 2.2 of methoxyl group (DS), and ethyl cellulose having 2.0 to 2.6 of ethoxyl groups (DS).

Examples of hydroxyalkyl cellulose include hydroxypropyl cellulose having 0.05 to 3.3 of hydroxypropoxyl group (MS).

Examples of hydroxyalkyl alkyl cellulose include hydroxyethyl methyl cellulose having 1.0 to 2.2 of methoxyl group (DS) and 0.1 to 0.6 of hydroxyethoxyl group (MS), hydroxypropyl methyl cellulose having 1.0 to 2.2 of methoxyl group (DS) and 0.1 to 0.6 of hydroxypropoxyl group (MS), and hydroxyethyl ethyl cellulose having 1.0 to 2.2 of ethoxyl group (DS) and 0.1 to 0.6 of hydroxyethoxyl group (MS).

"DS" is "Degree of Substitution" which means that the average number of alkoxyl groups attached to the anhydroglucose unit of cellulose. "MS" is "Molar Substitution" which means that the average number of moles of hydroxylalkyl groups per mole of anhydroglucose unit of cellulose.

Among them, preferred are hydroxyethyl methyl cellulose and hydroxypropyl methyl cellulose each having a high dissolution temperature (30 to 60° C.).

For collecting the water-soluble cellulose ether in high yields after filtration, the suspension used preferably comprises the water-soluble cellulose ether and water in a weight ratio of 10/100 to 50/100. The suspension should have a concentration enough to pump.

The water-soluble cellulose ether particles in the suspension liquid preferably have an average particle size of 0.1 to 2,000 μm as measured by sifting method.

As described above, the separating method of the invention involves filtering a suspension of water-soluble cellulose ether particles in water through a pressure filter of perforated metallic or ceramic filter medium for leaving a cake of water-soluble cellulose ether on the filter, removing the filter cake from the filter medium, and cleaning the filter medium with steam, compressed air, water under pressure or hot water.

In the step of filtering a suspension of water-soluble cellulose ether particles in water through a pressure filter of perforated metallic or ceramic filter medium, the suspension to be filtered is preferably at a temperature of 20 to 160° C., more preferably 70 to 140° C. because of cost performance, filter protection and prevention of dissolution of cellulose ether. The suspension to be filtered may be a liquid further containing sodium chloride and other salts in a concentration of about 1 to 30% by weight, in the reaction mixture resulting from etherifying reaction for the preparation of water-soluble cellulose ether and containing water-soluble cellulose ether, water, sodium chloride, other salts and organic matters.

For the pressure filtration, the pressure may vary over a wide range although the preferred pressure is generally in a range of about 0.001 to 1 MPa, especially about 0.01 to 0.5 MPa.

As a result of filtration, a cake of water-soluble cellulose ether is left on the filter. The cake is then removed from the filter medium. In the subsequent step, the filter medium is cleaned with steam, compressed air, water under pressure or hot water. The steam used herein is preferably at a temperature of 100 to 185° C., more preferably 100 to 160° C. and a pressure of 0.001 to 1 MPa, more preferably 0.01 to 0.5 MPa. The compressed air used herein is preferably at a pressure of 0.001 to 1 MPa, more preferably 0.01 to 0.5 MPa and a temperature of 10 to 160° C., more preferably 20 to 140° C. The pressurized water used herein is preferably at a temperature of 10 to 160° C., more preferably 20 to 140° C. and a pressure of 0.001 to 15 MPa. The hot water used herein is preferably at a temperature of 50 to 160° C., more preferably 70 to 140° C. and a pressure of 0.001 to 3 MPa.

In a preferred embodiment, after the filtration, the cake is washed with hot water and/or steam, and steam, compressed air or water under pressure is then blown back into the filter from the filter medium side (remote from the cake-depositing side) to loosen the cake from the filter medium, prior to the removal of the cake. By these steps, the foreign materials such as salts are washed out of the filter cake. Then the filter cake is composed essentially of the water-soluble cellulose ether, with the foreign materials such as salts being almost removed.

In a further preferred embodiment, after the removal of the filter cake from the filter medium, a flat jet nozzle is used to spray hot water under a pressure of at least 1 MPa, preferably 1.5 to 2 MPa, and at a temperature of 90 to 212° C., to the filter medium for rinsing the perforated filter medium in the filtrate direction. The resulting rinse water is recycled as the cake washing water (i.e., the source for water under pressure or steam), which becomes an aqueous solution containing salts to serve to reduce the dissolution temperature of the product having a high dissolution temperature, preventing clogging due to dissolution during the washing. In the hot water spraying step, the filter medium is cleaned, and the valuable product remaining in the filter medium is recovered and returned to the process, contributing to an improvement in yield.

While the separating method of the invention involves passing a suspension of water-soluble cellulose ether particles in water through a pressure filter of perforated metallic or ceramic filter medium, the pressure filter used herein may be a rotary pressure filter as illustrated in FIG. 1 of Japanese Patent No. 2,895,084, and filtration operation may be performed by the same procedure as illustrated in FIG. 3 except that the filter medium is different.

EXAMPLE

The invention is illustrated by the following example, which is given for illustration purposes only and is not meant to limit the invention. The filter used is a rotary pressure filter as illustrated in Japanese Patent No. 2,895,084 and manufactured by BHS of Germany.

Example 1

A hydroxyethyl methyl cellulose (HEMC) having 1.46 of methoxyl groups (DS) and 0.32 of hydroxyethyl groups (MS) and a dissolution temperature of 55° C., which was a reaction mixture after etherification reaction, was mixed with an amount of boiling water of 95° C. to produce a suspension containing 12 parts by weight of HEMC in 100 parts by weight of water. The suspension contained salts mainly composed of sodium chloride in a concentration of 6% by weight.

The suspension at 95° C. was fed to a rotary pressure filter, preheated at 100° C., with a filter surface area of 1 m² and 1 drum rotation per minute, under a pumping pressure of 0.2 MPa. The filter used was a perforated steel filter (pore size: 0.07 mm in diameter, plate thickness: 0.3 mm, pore pitch in the same direction as filter rotation: 0.30 mm, pore pitch in a direction perpendicular to filter rotation: 0.26 mm, material: stainless steel SUS304) manufactured by Pacific Special Alloy Castings Co., Ltd.

On the filter surface, a closed filter cake of 20 mm thick was formed. It was then intensively blown out with steam at 34° C. and 0.2 MPa.

Prior to the removal of the filter cake, hot water (95° C., 0.2 MPa) washing in the filtrate direction was followed by compressed air (20° C., 5 MPa) blowing in the backward direction to loosen the cake. Then the cake was removed from the filter surface by means of a scraper.

Following removal of the cake, hot water at 90° C. under a pressure of 1 MPa, preferably 1.5 to 2 MPa was sprayed to the perforated filter medium from flat jet nozzles for intensively cleaning matters adhered to the filter medium.

The filter cake was dried at 100° C. for 3 hours, after which the content of residual salts in the filter cake was measured to be 0.1% by weight to the dried hydroxypropyl methyl cellulose as analyzed by the measurement method of a heat loss described in the hydroxypropyl methyl cellulose assay of Japanese Pharmacopoeia, 14th Ed.

Then the cycle described was similarly repeated using the water under pressure at 90° C. consumed in the cleaning of the filter medium as the cake washing water. Performance comparisons over many hours did not reveal declining filter throughput.

Example 2

A hydroxypropyl methyl cellulose (HPMC) having 1.50 of methoxyl groups (DS) and 0.20 of hydroxypropoxyl groups (MS) and a dissolution temperature of 40° C., which was a reaction mixture after etherification reaction, was mixed with an amount of boiling water of 95° C. to produce a suspension containing 50 parts by weight of HPMC in 100 parts by weight of water. The salt concentration in the suspension was 25% by weight.

The suspension was processed as in Example 1 except that the filter used was a perforated zirconia ceramic filter with the same specifications. Following removal of the cake, water under pressure (90° C., 10 MPa) was sprayed to the perforated filter medium from flat jet nozzles for intensively cleaning matters adhered to the filter medium.

The filter cake was dried at 100° C. for 3 hours, after which a heat loss was measured to be 0.01% by weight to the dried hydroxypropyl methyl cellulose as analyzed by the method in the hydroxypropyl methyl cellulose assay of Japanese Pharmacopoeia, 14th Ed. No decline of filter throughput was observed over many hours.

The hydroxypropyl methyl cellulose thus collected had a viscosity of 4,000 mPa·s as measured in a 2 wt % aqueous solution thereof at 20° C. by the HPMC2208 viscosity measurement of US Pharmacopoeia.

The process sequence can also be carried out with the appropriate modifications in pressure filter funnels operating batchwise.

Japanese Patent Application No. 2004-318769 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of separating a water-soluble cellulose ether from an aqueous suspension, comprising the steps of:
   introducing a reaction mixture containing water-soluble cellulose ether particles having an average particle size of 0.1 to 2000 microns in diameter, into an agitator vessel containing water at or above a dissolution temperature, thereby producing an aqueous suspension including water and water-soluble cellulose particles;
   flowing said suspension, under pressure and at a temperature of 70° to 140° C., through a rotary pressure filter, said rotary pressure filter including a perforated, 0.2 to 2 mm thick, metal filter plate, said filter plate having perforations which were formed by electron beam machining, said perforations having sidewalls of differing pore pitch and a diameter that substantially corresponds to the average particle size of the water-soluble cellulose either particles;
   capturing said particles on said filter plate as a result of said flowing, thereby forming a cake of accumulated particles;
   ceasing said flowing;
   removing said cake from said filter plate;
   directing a stream of water under pressure through a jet nozzle at said filter plate after said cake has been removed in order to remove any remaining accumulations from said filter plate; and
   recycling the water that had been used to remove any remaining accumulations in order to use it for washing said cake.

* * * * *